Feb. 12, 1952

M. A. LALANDE 2,585,019

VOICE FREQUENCY SIGNALING CIRCUIT

Filed Feb. 18, 1947

INVENTOR.
MARC ANDRE LALANDE
BY Robert Harding Jr.
ATTORNEY

Patented Feb. 12, 1952 2,585,019

UNITED STATES PATENT OFFICE 2,585,019

VOICE FREQUENCY SIGNALING CIRCUIT

Marc A. Lalande, Paris, France, assignor to International Standard Electric Corporation, New York, N. Y., a corporation of Delaware Application February 18, 1947, Serial No. 729,255
In France February 6, 1945

Section 1, Public Law 690, August 8, 1946
Patent expires February 6, 1965

8 Claims. (Cl. 179—84)

Figure 1:
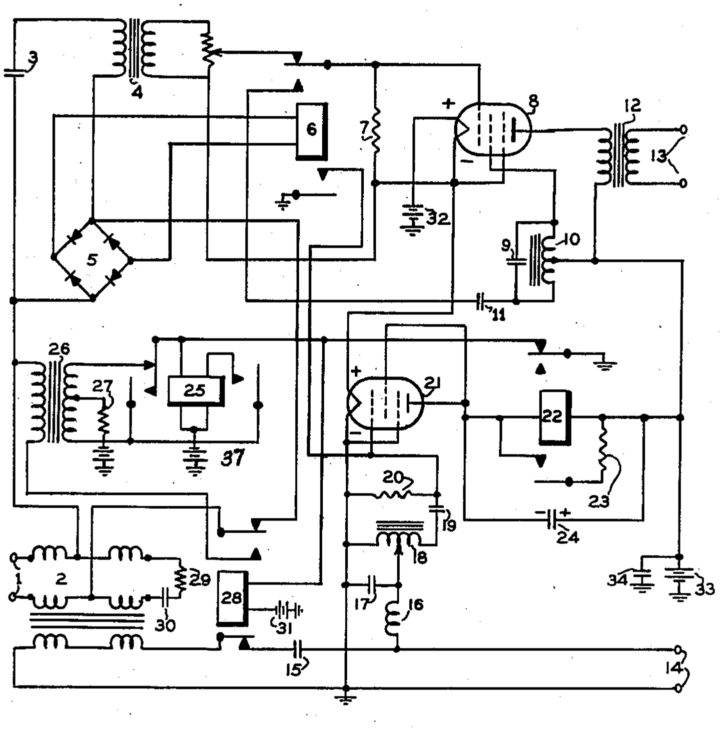

This invention relates to electronic apparatus, and also to the transmission of intelligence by methods and means involving such apparatus.

An object of the invention is to provide apparatus making it possible, among other uses thereof, to send low frequency signals over a normally higher frequencies transmission system, without the necessity of first transforming the low frequency call into a call of substantially the same high frequency as that normally prevailing in the system.

It is known that in electronically amplified telephone transmission systems the very low frequency calls, e. g. of the order of 20 C. P. S., can be transmitted by means of devices that transform this very low frequency call into a call of conventional higher frequency, which higher frequency call is then transmitted in the same way as the components of the normal communication signals. However, this method of transmitting call signals requires certain precautions for discrimination at the receiving end between the components of the communication signals and those of the call signals, which precautions in turn require the use of additional equipment, with its attendant additional expense and space allotting problems.

If, however, means can be devised for transmitting the low frequency calls after they have been stepped up in frequency only to such a degree as to coincide with the non-troublesome range of the normally transmitted higher frequency signals as, for example, a transformation from 20 C. P. S. to 135 C. P. S., which latter frequency can readily be eliminated from the range of frequencies that are important for normal telephonic communication purposes, the result will be a satisfactory reception, at the receiving stations of the system, both in respect to the normal signals of high frequency, corresponding to voice transmission, and in respect to the occasional calls of very low frequency, such as are produced by magneto operation or the like.

An object of the present invention, therefore, is to provide means for rendering a conventional telephone transmission system capable of carrying either high frequency carrier current for its normal purpose, or low frequency call current on special occasions; the conversion from the former to the latter service occurring automatically whenever a low frequency call is inaugurated.

As a means to the achievement of the object just defined, as well as others, the invention includes as a further object the provision of electronic apparatus including amplifying and oscillating means so interrelated as to make possible the automatic conversion from an amplifying function to an oscillating function whenever such a conversion becomes desirable as, for example, but only as an example, whenever it is desired to interrupt high frequency telephonic communcation in order to send a low frequency call signal over the same transmission circuits.

More specifically, another object of the invention is to provide transmission circuits comprising a vacuum tube so constructed and controlled that the said tube can operate alternately as an amplifier acting to substantially eliminate a pre-selected band of frequencies and as an oscillator functioning to generate currents having frequencies within said pre-selected band.

Another object is to provide a novel amplifier-oscillator arrangement of the character herein disclosed for telephonic as well as for all other purposes to which the disclosed arrangement may, per se, be applied.

As one feature of the invention the following disclosure teaches that there may be inserted in the screen grid connection of an electron discharge amplifier tube a circuit which is tuned to a predetermined frequency and which accordingly presents a high impedance to this frequency, and that there may be provided a switching device that is capable of modifying the effect of said tube in such a way as to cause the latter to operate as an oscillator whose frequency is that of the tuned circuit.

As another feature of the invention, the following disclosure teaches that the above-described screen grid amplifier tube may be so arranged as to operate either as an amplifier that substantially eliminates a predetermined frequency (or frequency band) or as an oscillator having such predetermined frequency, and that the alternation from one function to the other may be effected by a switching device responsive to a local low frequency call current; the said switching device thus operating to control the transmission in the carrier current system of an easily transmittable predetermined frequency and to confine the period of transmittability to the duration of such low frequency call current, wherefore there is no possibility of undue prolongation thereof into any period of normal higher frequency transmission.

As another feature of the invention, the following disclosure teaches that the above-described switching device may also cause a temporary isolating of the call receiving apparatus, whose repeating relay may be made sufficiently slow-releasing to insure that said switching device will have time to function, without on the other hand becoming a possible source of interference with normal functioning of the said call-receiving apparatus after the temporary period of operation of the said switching device for performance of its special function, above described. The switching device, as will be pointed out hereinafter, may also cause the temporary opening of the loop of the transmission system as a further insurance of correct transmission of the low frequency call signals; the possibility of concurrent parasitic loop priming oscillations being thus averted.

Figure 2:
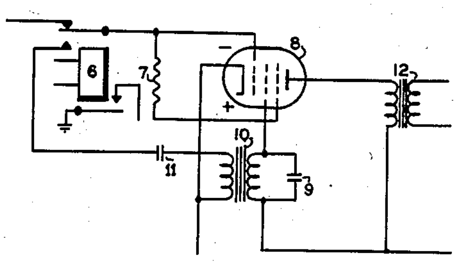

These objects and features of the invention, as well as others, will be explained in detail in the following description wherein references are made to the accompanying drawings, in which:

Fig. 1 illustrates how the invention may be applied to a telephone transmission system of the four-wire type; and Fig. 2 illustrates a variant method of arranging the oscillator circuit associated with the vacuum tube 8 of Fig. 1.

Referring first to Fig. 1, there is illustrated therein a telephone transmission system including a four-wire circuit having receiving wires 14 and sending wires 13; also a two-wire circuit 1 with differential transformer 2, the secondary of the latter being connected into the said receiving circuit 14, and a balancing network therefor being shown at 29—30. Under normal conditions, that is, during transmission of telecommunication signals, the signals arriving over line 1 are transmitted by transformer 4 and the upper contacts of relay 6 to the vacuum tube 8 and the latter acts as an amplifier, under the said normal conditions, to send the signals forward to the transmission line 13 by way of transformer 12. The second vacuum tube, illustrated at 21, is a call receiving tube with which is associated a call-receiving relay 22 to be further described.

As above noted, tube 8 is normally connected as an amplifier. However, upon energization of relay 6 there is established a connection with a circuit 9—10 which is tuned to the call frequency in the system, e. g. 135 C. P. S. Such energization of relay 6 will occur in any known manner whenever a very low frequency call, e. g. of 20 C. P. S., arrives by way of circuit 1 but not when signals of higher frequency arrive; the low frequency current being supplied to relay 6 by way of rectifier bridge 5. The result is to set up an oscillating circuit by reason of movement of the upper armature of relay 6 to its lower position thus keying oscillator coil 10 into closed circuit relationship with the control and screen grids of tube 8. The tube's plate, separated from the other elements by the interposed suppressor electrode, serves only as output electrode and does not react appreciably at the oscillator frequency. A 135 C. P. S. transmission current is thus sent over the four-wire circuit 13 by means of the transformer 12.

Under transmission conditions of telecommunication signals, the signals arriving over line 1 are transmitted by transformer 4 and the rest contacts of relay 6 to the amplifier tube which sends them over the transmission line 13. Condenser 3 prevents the 20 C. P. S. current from reaching transmormer 4.

A blocking condenser of the direct current is shown at 11, and the polarization battery of tube 8 at 33.

Fig. 1 shows a connection arrangement of the Hartly type for the oscillator circuit 8—9—10. It is however evident that use may be made of any other connection arrangement, e. g. that shown in Fig. 2, in which the inductance 10 of the screen grid tuned circuit constitutes the secondary of a transformed.

Besides, relay 6 when operating grounds the grid of the call-receiving tube 21 for the purpose of preventing harmonics of the 20 C. P. S. call current from reaching this tube across differential transformer 2, condenser 15 and the circuit 18, 19 and 20, and consequently causing untimely operation of the local receiving relay 22.

Furthermore, relay 6 opens at its rest contact the four-wire circuit loop. As a matter of fact, and particularly in the case of a radio link, it may happen, when the two-wire circuits are not connected to telephone stations, that so-called loop priming oscillations are produced in the four-wire link assembly owing to lack of balancing. As such oscillations might possibly prevent the transmission of the calls, opening of the loop puts a stop to them and thus insures correct transmission of the call signals.

If a 135 C. P. S. signal now arrives over the receiving wires 14 of the four-wire circuit, it will be partly blocked by condenser 15 disposed in series with the secondary of the differential transformer 2. The system formed by self-inductance 16, condenser 17 and the portion of self-transformer 18 located at the terminals of condenser 17 constitutes a 135 C. P. S. resonant circuit. At the terminals of condenser 17 there is then created an over-voltage at the frequency of the received signal, and the same is transmitted, multipled by the transformation ratio of self-transformer 18, to the control grid of the receiving tube 21 across condenser 19. The latter becomes charged, making the grid strongly negative, and this results in causing release of plate relay 22. This relay is on the one hand shunted by resistance 23 when in operating position in order to facilitate its release, and consequently requires a lesser negative voltage on the grid, but its return into operation is facilitated at the end of the call by the suppression of the shunt. On the other hand the high value electrolytic condenser 24 is located at the terminals of its winding, and it makes the relay slow releasing in such a way that, when a call is transmitted over line 1, relay 6 may have time to ground the grid of tube 21 in order to block this tube.

Plate relay 22, when falling back upon arrival of an incoming call, sets into action by means of its rest contact the relay 25, which is fed by battery 37 and which begins to beat owing to the arrangement of the connections and to its adjustment to about 20 C. P. S. At this cadence it reverses the current in the primary of call transformer 26, the mid-point of which is grounded across resistance 27.

Then too, relay 28 comes into operation and connects the secondary of call transformer 26 to the mid-point of the differential transformer 2, which is shown with its balancing network 29—30. The call current is thus transmitted at 20 C. P. S. over the two-wire line 1.

Furthermore, this relay 28 opens the receiving circuit in order that the harmonics of the call current may not interfere with the operation of tube 21 of the call receiver through the secondary of the differential transformer, since balancing is not provided at the frequency of 20 C. P. S.

It is evident that the described and illustrated arrangements are not limitative and that numerous modifications and adaptations can be made in them without departing from the scope of the invention.

I claim:

1. In a system for normally transmitting telecommunication signals of relatively high frequency, and including a call-receiving device, and an amplifier comprising an electron discharge device having at least two control electrodes and normally operative to amplify said signals and attenuate other means for applying telecommunication signals to one of said control electrodes and means for converting said electron discharge device to generate relatively low frequency signals applied to another of said control electrodes to amplify and transmit such low frequency signals whenever transmission thereof is desired, switching means for energizing said last-named means, said switching means further operating to render said call-receiving device ineffective, for the duration of the low frequency transmission interval, and shunt resistance means cooperating with said call-receiving device to facilitate such temporary isolation of said device.

2. In a transmission system wherein first signals in a first frequency band and second signals of a second frequency are employed for communication, means for receiving said first and second signals, and amplifier including an electron discharge device having at least two control electrodes, said electron discharge device having one of its control electrodes connected to said receiving means, said amplifier being normally operative to amplify said first signals, a regenerative feedback circuit including a second control electrode and means connected to said receiving means and responsive to said second signals for connecting said feedback circuit to said amplifier, whereby said electron discharge device generates and amplifies oscillations of a predetermined frequency.

3. Apparatus according to claim 2 whereby at least a portion of said feedback circuit is normally connected in said output circuit and prevents amplification of signals of a predetermined frequency.

4. In a transmission system for normally transmitting signals of a predetermined frequency, an electron discharge device having at least two control electrodes, said device normally operating as an amplifier for the normally transmitted signals, said signals being applied to one of said control electrodes, means for connecting said electron discharge device to generate and amplify signals of a second frequency in response to received low frequency signals, comprising regenerative oscillating means connected to said second grid, said oscillating means being normally inoperative, and means responsive to received low frequency signals for rendering said oscillating means operative.

5. In a transmission system for normally transmitting telecommunication signals, an amplifier including an electron discharge device having a plurality of control electrodes, an output and input circuit for said amplifier means for normally applying telecommunication signals to one of said control electrodes, means for utilizing said electron discharge device for generating oscillations and for amplifying said oscillations comprising an oscillatory circuit connected in said input circuit and to a second one of said control electrodes, switching means for energizing said oscillatory circuit, means responsive to low frequency signals in said system for operating said switching means and energize said oscillatory circuit and including means for disabling said means for applying telecommunication signals to said one control electrode.

6. In a telecommunication system wherein signals of a first frequency and signals of a second frequency are employed for communication means for receiving said first frequency signals and signals of a third frequency, an amplifier including an electron discharge device having a plurality of control electrodes, means for normally applying signals of said first frequency to one of said amplifier control electrodes, an oscillatory circuit tuned to the frequency of said second frequency and connected to a second of said amplifier control electrodes, switching means for energizing said oscillatory circuit, means for operating said switching means in response to received third frequency signals to energize said oscillatory circuit and cause amplification and transmission of signals of said second frequency signal and including means for disconnecting said first control electrode from said means for applying signals of the first frequency thereto.

7. In a telecommunication system according to claim 6 including a call receiving device for receiving signals of the first and second frequencies and means responsive to reception of signals of said third frequency, for disabling said call receiving device.

8. In a telecommunication system according to claim 7 and further comprising means for generating oscillations of said third frequency and means associated with said call receiving device responsive to signals of said second frequency received by said call receiving device adapted to energize said last named generating means and disable said amplifier.

MARC A. LALANDE.

REFERENCES CITED

The following references are of record in the file of this patent:

UNITED STATES PATENTS

| Number | Name | Date |
|---|---|---|
| 1,454,158 | Espenschied | May 8, 1923 |
| 1,589,405 | Loynes | June 22, 1926 |
| 2,006,440 | Chireix | July 2, 1935 |
| 2,121,434 | Klinedinst et al. | June 21, 1938 |
| 2,306,121 | Hagen | Dec. 22, 1942 |
| 2,355,642 | Gose | Aug. 15, 1944 |
| 2,414,440 | Brandt | Jan. 21, 1947 |
| 2,414,795 | Brandt | Jan. 28, 1947 |